US012450828B2

(12) United States Patent
Wang et al.

(10) Patent No.: US 12,450,828 B2
(45) Date of Patent: Oct. 21, 2025

(54) METHOD AND SYSTEM FOR AUTOMATICALLY CONSTRUCTING EDITABLE MODEL OF ISOGEOMETRIC TOPOLOGY OPTIMIZATION RESULT

(71) Applicant: South China University of Technology, Guangzhou (CN)

(72) Inventors: Yingjun Wang, Guangzhou (CN); Yuhao Yang, Guangzhou (CN); Zhongyuan Liao, Guangzhou (CN)

(73) Assignee: South China University of Technology, Guangzhou (CN)

( * ) Notice: Subject to any disclaimer, the term of this patent is extended or adjusted under 35 U.S.C. 154(b) by 165 days.

(21) Appl. No.: 18/265,533

(22) PCT Filed: Sep. 24, 2021

(86) PCT No.: PCT/CN2021/120037
§ 371 (c)(1),
(2) Date: Jun. 6, 2023

(87) PCT Pub. No.: WO2022/179097
PCT Pub. Date: Sep. 1, 2022

(65) Prior Publication Data
US 2024/0029348 A1    Jan. 25, 2024

(30) Foreign Application Priority Data
Feb. 25, 2021  (CN) .......................... 202110211498.6

(51) Int. Cl.
*G06F 30/10*    (2020.01)
*G06F 30/17*    (2020.01)
(Continued)

(52) U.S. Cl.
CPC .............. *G06T 17/00* (2013.01); *G06F 30/10* (2020.01); *G06T 19/20* (2013.01); *G06T 2219/2021* (2013.01)

(58) Field of Classification Search
CPC . G06T 17/00; G06T 19/20; G06T 2219/2021; G06T 2200/04; G06T 7/564;
(Continued)

(56) References Cited

U.S. PATENT DOCUMENTS 5,506,785 A  *  4/1996  Blank ..................... G06T 17/30
                                                        700/98
9,875,577 B2 *  1/2018  Quilot ................... G06T 17/205
(Continued)

FOREIGN PATENT DOCUMENTS

CN        103455674 A  *  12/2013
CN        104156546 A     11/2014
(Continued)

OTHER PUBLICATIONS

Screenshots from YouTube video clip entitled "Autodesk Fusion 360 Basics—Lofting Tools (Tutorial 05)" uploaded on Apr. 17, 2020 by user "3D CAD Projects" [Retrieved on Apr. 2, 2025]. Retrieved from the Internet: <URL: https://www.youtube.com/watch?v=h01pBO4ahtQ> (Year: 2020).*

(Continued)

*Primary Examiner* — King Y Poon
*Assistant Examiner* — Michelle Hau Ma
(74) *Attorney, Agent, or Firm* — The Dobrusin Law Firm, P.C.

(57) ABSTRACT

Disclosed is a method for automatically constructing an editable model of an isogeometric topology optimization result. The method addresses the problem of three-dimensional isogeometric topology optimization, and performs quick and efficient post-processing on a three-dimensional (Continued)

isogeometric topology optimization result, so as to achieve the aim of automatically constructing a result model thereof and the aim of the result model being editable. According to the method, design variables are taken as high-dimensional coordinates of a control point, spline surfaces represented by control points of the three-dimensional isogeometric topology optimization result are extracted in a layered manner, and lofting is performed on top contours of the spline surfaces, such that the steps of constructing an isogeometric topology optimization model are simplified.

14 Claims, 8 Drawing Sheets

(51) Int. Cl.
*G06F 30/20* (2020.01)
*G06F 30/23* (2020.01)
*G06T 17/00* (2006.01)
*G06T 19/20* (2011.01)

(58) Field of Classification Search
CPC .......... G06F 30/10; G06F 30/17; G06F 30/23; G06F 30/20
See application file for complete search history.

(56) References Cited

U.S. PATENT DOCUMENTS

| | | | |
|---|---|---|---|
| 2009/0024370 A1 | 1/2009 | Scott et al. | |
| 2013/0338987 A1 | 12/2013 | Cheng et al. | |
| 2018/0210983 A1 | 7/2018 | Zhang et al. | |
| 2020/0043231 A1 | 2/2020 | Zhang et al. | |
| 2020/0320228 A1 | 10/2020 | Lupas | |

FOREIGN PATENT DOCUMENTS

| | | | | |
|---|---|---|---|---|
| CN | 107067472 | A | | 8/2017 |
| CN | 108491654 | A * | 9/2018 | ............. G06F 30/23 |
| CN | 109657284 | A | | 4/2019 |
| CN | 109670200 | A | | 4/2019 |
| CN | 111581776 | A | | 8/2020 |
| CN | 112100877 | A | | 12/2020 |
| CN | 112926207 | A | | 6/2021 |
| JP | 4543759 | B2 * | 9/2010 | |
| TW | 200915212 | A * | 4/2009 | |

OTHER PUBLICATIONS

Screenshots from YouTube video clip entitled "Autodesk Inventor Loft Tutorial—How to Use Loft for 3D Modeling" uploaded on May 18, 2014 by user "3D Insider" [Retrieved on Apr. 2, 2025]. Retrieved from the Internet: <URL: https://www.youtube.com/watch?v=s6hb7GWyAug> (Year: 2014).*

Screenshots from YouTube video clip entitled "Loft with Guide Curves using SolidWorks" uploaded on Mar. 17, 2015 by user "Adam Bender" [Retrieved on Apr. 2, 2025]. Retrieved from the Internet: <URL: https://www.youtube.com/watch?v=7LxakM4VuF4> (Year: 2015).*

Antonelli, Michele et al. Subdivision surfaces integrated in a CAD system [Online]. Jun. 16, 2013 [Retrieved on Jul. 14, 2025]. Retrieved from the Internet: <URL: https://www.sciencedirect.com/science/article/pii/S0010448513001048#f000035 > (Year: 2013).*

Giulio Costa; A 2D Topology Optimisation Algorithm in NURBS Framewok with Geometric Constraints, Nov. 7, 2019.

Xianda Xie, A Hierarchical Spline Based Isogeometric Topology Optimization Using Moving Morphable Components, Oct. 10, 2019.

Yuliang Gao, A NURBS-Based Finite Cell Method for Structural Topology Optimization Under Geometric Constraints (2019).

Yingjun Wang, Geometrically Constrained Isogeometric Parameterized Level-Set Based Topology Optimization Via Trimmed Elements (2016).

Jie Gao, Isogeometric Density Field Method for Topology Optimization of Micro-Architected Materials (2019).

International Search Report dated Dec. 13, 2021, Application No. PCT/CN2021/120037.

* cited by examiner

METHOD AND SYSTEM FOR AUTOMATICALLY CONSTRUCTING EDITABLE MODEL OF ISOGEOMETRIC TOPOLOGY OPTIMIZATION RESULT

FIELD OF THE INVENTION

The present disclosure relates to the field of researches of isogeometric topology optimization technologies, and in particular, to a method and system for automatically constructing an editable model of an isogeometric topology optimization result.

BACKGROUND OF THE INVENTION

Isogeometric analysis, proposed by Hughes in 2005, is considered to be one of the most promising directions in the field of topology optimization. Due to its innovative proposal of using an NURBS basis function, which is most commonly used in computer graphics, as a basis function of a geometric model in topology optimization, it achieves seamless integration from Computer Aided Engineering (CAE) to Computer-Aided Design (CAD), and solves a problem that CAE and CAD cannot directly communicate with each other for decades.

At present, isogeometric topology optimization is widely applied to various theoretical and engineering analysis problems because of its advantages of low time consumption and high accuracy. However, it is very difficult to express an isogeometric topology optimization result of a three-dimensional complex problem. In the past, the mode of finding contour surfaces and then establishing triangular patches in the overall three-dimensional design field was used, and a generated Stereolithography (STL) file finally forms a surface of a three-dimensional entity by the patches. However, by the expression method, a three-dimensional isogeometric topology optimization result losses its original advantages, because the entity in the STL format cannot be selected and edited arbitrarily in CAD software. In order to solve the abovementioned difficulties and the problems in actual three-dimensional topology optimization, a method for automatically constructing an editable geometric model of an isogeometric topology optimization result that can be used for a complex three-dimensional isogeometric topology optimization problem is needed, so that a final optimization result entity can be selected and edited arbitrarily in the CAD software.

SUMMARY OF THE INVENTION

A main objective of the present disclosure is to overcome the disadvantages and deficiencies in the prior art, and to provide a method and a system for automatically constructing an editable model of an isogeometric topology optimization result. First, any three-dimensional isogeometric topology optimization problem is decomposed into a plurality of two-dimensional isogeometric topology optimization problems with design domains of plane domains parallel to one another. Then, a two-dimensional topology optimization result is processed into a selectable and editable feature in CAD software, so that the problem that the conventional optimization result in an STL format cannot be selected and edited is solved. Meanwhile, the present disclosure has the characteristics of convenience in operation, short processing time, selectable and editable construction result, and the like. The method is not limited to isogeometric topology optimization.

A first objective of the present disclosure is to provide a method for automatically constructing an editable model of an isogeometric topology optimization result.

A second objective of the present disclosure is to provide a system for automatically constructing an editable model of an isogeometric topology optimization result.

The first objective of the present disclosure is implemented by the following technical solution.

A method for constructing an editable model of an isogeometric topology optimization result includes the following steps:

S1, completing topology optimization on the basis of an isogeometric method to obtain an isogeometric topology optimization result;

S2, taking design variables as high-dimensional coordinates, and acquiring Non-Uniform Rational B-Spline (NURBS) models of various layers in layers from the isogeometric topology optimization result, so as to obtain layered NURBS surface information;

S3, automatically arranging and importing the layered NURBS surface information into CAD software according to direction coordinates;

S4, extracting a top contour of each NURBS surface in sequence to obtain section geometric model of each layer, and establishing a sketch contour;

S5, establishing a guide line between corresponding contours of each contour group;

S6, determining whether there is a contour that has an internal contour, and performing S7 if there is an internal contour, or performing S9 if there is no internal contour;

S7, performing continuous lofting on the external contours;

S8, performing continuous lofting and cutting on the internal contour;

S9, performing continuous lofting on each contour; and

S10, outputting an entity, and obtaining an automatic construction model of the isogeometric topology optimization result finally.

Further, the acquiring NURBS models of various layers in layers is as follows specifically:

directly representing control points at different height layers in the isogeometric topology optimization result as layered NURBSs, that is, taking the design variables as high-dimensional coordinates of the control points, so that the NURBS surfaces represented by the layered NURBSs have height changes, and layered NURBS surface information is obtained.

Further, the automatically arranging and importing the layered NURBS surface information into CAD software according to direction coordinates is as follows specifically: generating the acquired layered NURBS surface information by analysis software and saving the layered NURBS surface information in a format that can be opened by the CAD software, that is, the parameters between surfaces of layers being consistent with an optimization result.

Further, the extracting a top contour of each surface in sequence is as follows specifically: establishing a bottom reference surface parallel to a bottom of an input surface; establishing an intersection reference surface parallel to the bottom reference surface to intersect the input surface; cutting a surface part between the bottom reference surface and the intersection reference surface by using a surface cutting tool; establishing a stretch on the intersection reference surface; and extracting a top contour line by using a conversion entity tool to obtain a sketch contour 1-N.

Further, the establishing a guide line between corresponding contours of each contour group is as follows specifically: there is at least one broken line segment that is connected end to end and penetrates through the overall model from top to bottom at an edge of the same group of continuous lofting contour; and each cusp of all contour sketches has at least one broken line segment penetrating through the cusp.

Further, the determining whether there is an internal contour is as follows specifically: viewing and determining whether another one or more closed contours (groups) are included inside each closed contour by the methods of geometric topology feature recognition and computer vision, the closed contour included in another closed contour being referred to as an internal contour; and lofting and cutting need to be performed on the internal contour. The above-mentioned determination based on computer vision may call, for example, a pointPolygonTest function of OpenCV to determine whether there is an internal contour.

Further, the performing continuous lofting on the external contours is as follows specifically: using a lofting and stretching tool to select corresponding contour in each sketch as a lofting contour line in sequence from bottom to top and select each line segment of the broken line segment intersecting the contour group as a lofting guide line in sequence from bottom to top.

Further, the outputting an entity is as follows specifically: if there is a contour sketch that has a cusp, then a side surface of the entity is spliced by a plurality of spline surfaces, and a splicing line is a broken line segment with a cusp penetrating through the cusp; if all sketches do not have a cusp, then the side surface of the entity is an overall spline surface; and a final model entity has the characteristics of being selectable and being editable.

The second objective of the present disclosure is implemented by the following technical solution.

A system for automatically constructing an editable model of an isogeometric topology optimization result, used for implementing the method for automatically constructing an editable model of an isogeometric topology optimization result, includes: a three-dimensional isogeometric topology optimization module, an NURBS model layered acquisition module, a layering result importing module, a surface top contour extraction module, a guide line establishment module, an internal contour determination module, an external contour lofting and stretching module, an internal contour lofting and cutting module, a discrete contour continuous lofting module, and a result output module.

The three-dimensional isogeometric topology optimization module solves any three-dimensional topology optimization problem by using an isogeometric topology optimization method.

The NURBS model layered acquisition module is used for layering an isogeometric topology optimization result into a plurality of spline surfaces according to a certain direction to obtain an NURBS surface of each layer.

The layering result importing module is used for importing spline surface results of geometric topology optimization acquired in layers into CAD software.

The surface top contour extraction module is used for extracting a top contour feature of each input surface.

The guide line establishment module is used for establishing a broken line segment that is connected end to end in a sequence from bottom to top, and ensures that each broken line section penetrates through a contour group corresponding thereto.

The internal contour determination module is used for determining whether a contour sketch has an internal contour. Continuous lofting and stretching as well as stretching and cutting need to be performed on the internal contour and the external contours respectively if the contour sketch has an internal contour; and only continuous lofting and stretching need to be performed on each group of contours if the contour sketch does not have an internal contour.

The external contour lofting and stretching module is used for performing continuous lofting and stretching on each of external contour groups corresponding to each other respectively.

The internal contour lofting and cutting module is used for performing continuous lofting and cutting on each of internal contour groups corresponding to each other respectively, and meanwhile, ensures that the cutting penetrates through the entity.

The discrete contour continuous lofting module is used for performing continuous lofting and stretching on the contour groups without internal contours respectively.

The result output module is used for outputting a selectable and editable entity finally obtained after lofting.

Compared with the prior art, the present disclosure has the following beneficial effects:

1. According to the present disclosure, contour surface do not need to be found to establish triangular patches, and a result of a three-dimensional topology optimization problem is extracted as a plurality of a spline surfaces, so that the overall modeling time is greatly shortened, and a modeling process is greatly simplified and is easy to understand.
2. A modeling result obtained by the present disclosure is a lofting feature-based entity, and has the characteristics of being selectable and editable arbitrarily.
3. The present disclosure solves the problem of efficient post-processing of a complex isogeometric topology optimization problem, and a post-processing result is more intuitive.

DETAILED DESCRIPTION OF THE EMBODIMENTS

The present disclosure will be further described below in detail with reference to the embodiments and accompanying drawings, but the implementations of the present disclosure are not limited thereto.

The present disclosure is described by taking a classical flexible mechanism optimization result in isogeometric topology optimization as an example. The present disclosure is not limited to the isogeometric topology optimization.

Embodiment 1

Figure 1:
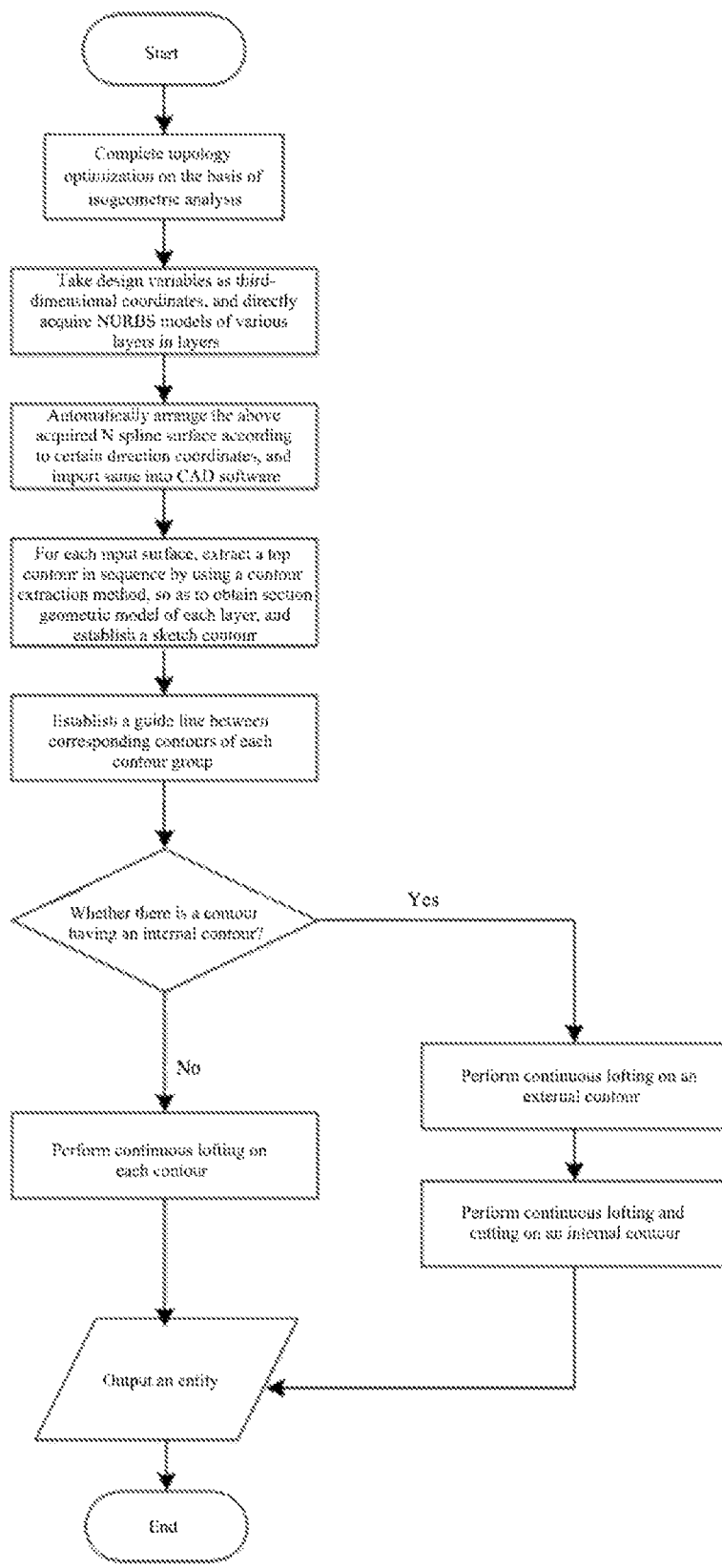
FIG. 1 is a flowchart of a method for constructing an editable model of an isogeometric topology optimization result of the present disclosure.

A method for constructing an editable model of an isogeometric topology optimization result, as shown in FIG. 1, includes the following steps.

At S1, isogeometric analysis-based topology optimization of a three-dimensional flexible mechanism is performed.

At S2, isogeometric topology optimization results of the three-dimensional flexible mechanism are acquired in layers in z-direction, that is, a direction from bottom to top, so as to obtain NURBS surface parameter information of each layer. In the example, the design variable is control point density, so the control point density is taken as third dimension information of the NURBS surface, that is, height information, and the three-dimensional NURBS surface is obtained as optimization information of a layer.

Figure 2:
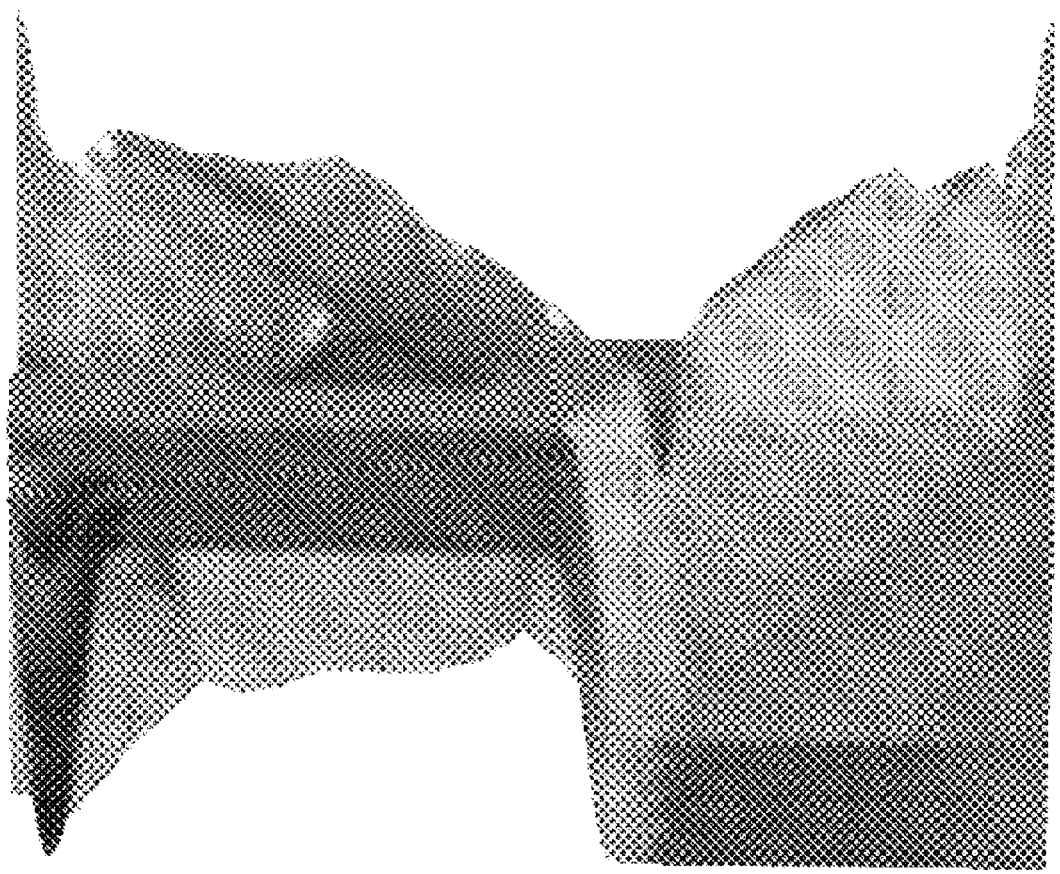
FIG. 2 is a schematic diagram of a plurality of NURBS surface arrangements with optimization results of a three-dimensional isogeometric topology optimization problem in Embodiment 1 of the present disclosure.

At S3, the acquired N spline surfaces are correspondingly placed and imported into CAD software to obtain N NURBS surface arrangements as shown in FIG. 2.

Figure 3:
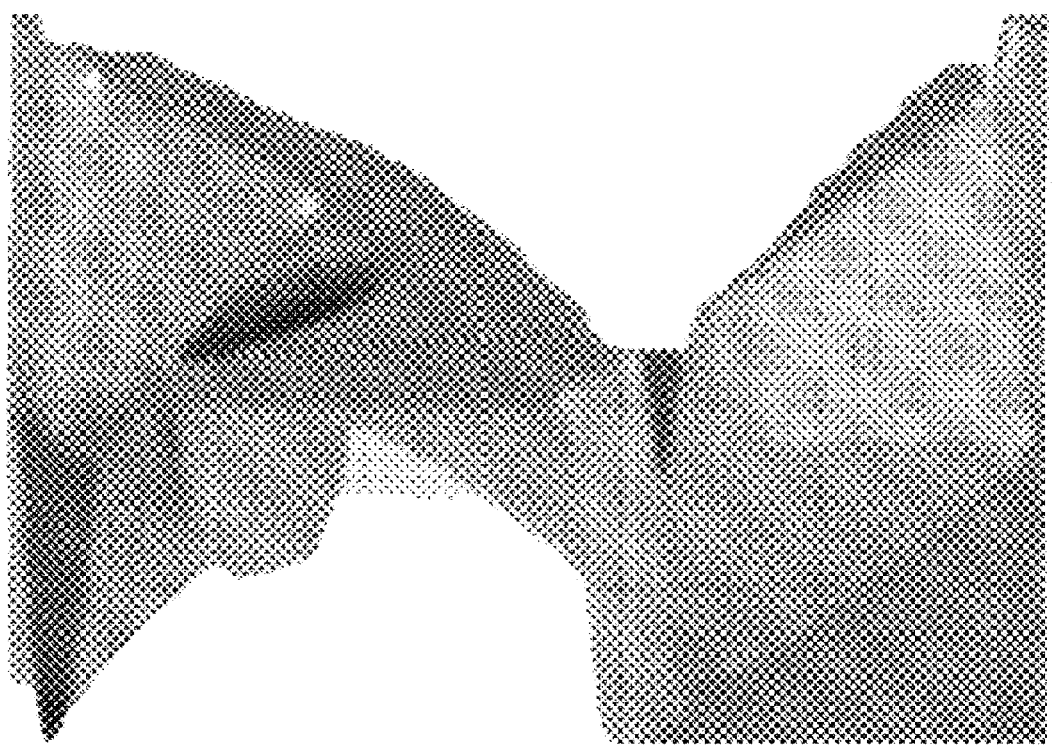
FIG. 3 is a schematic diagram of a process of extracting a contour of a single NURBS surface in Embodiment 1 of the present disclosure.
Figure 4:
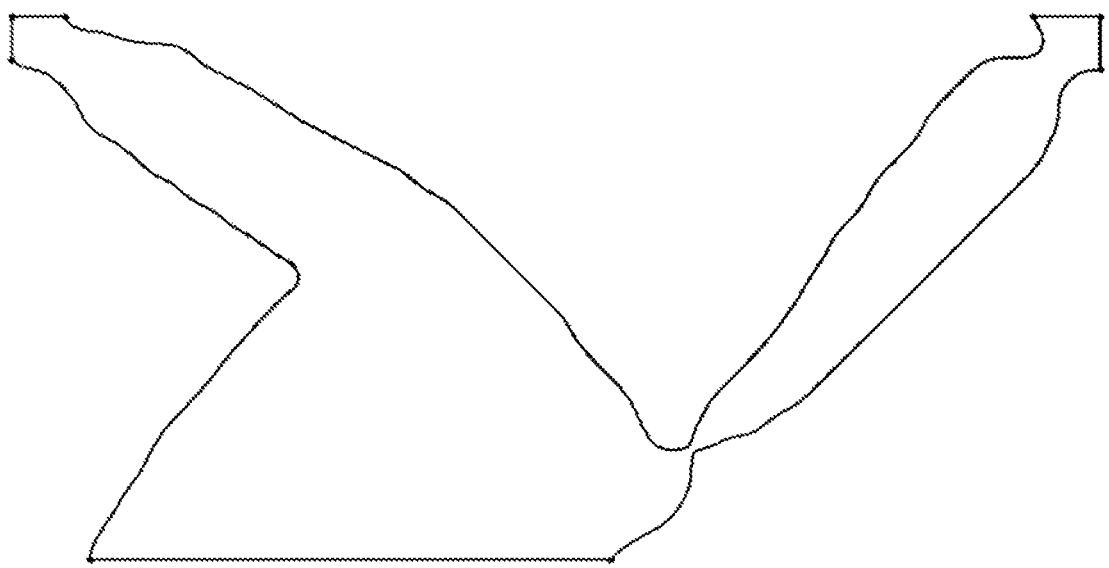
FIG. 4 is a schematic diagram of a single contour extracted in Embodiment 1 of the present disclosure.
Figure 5:
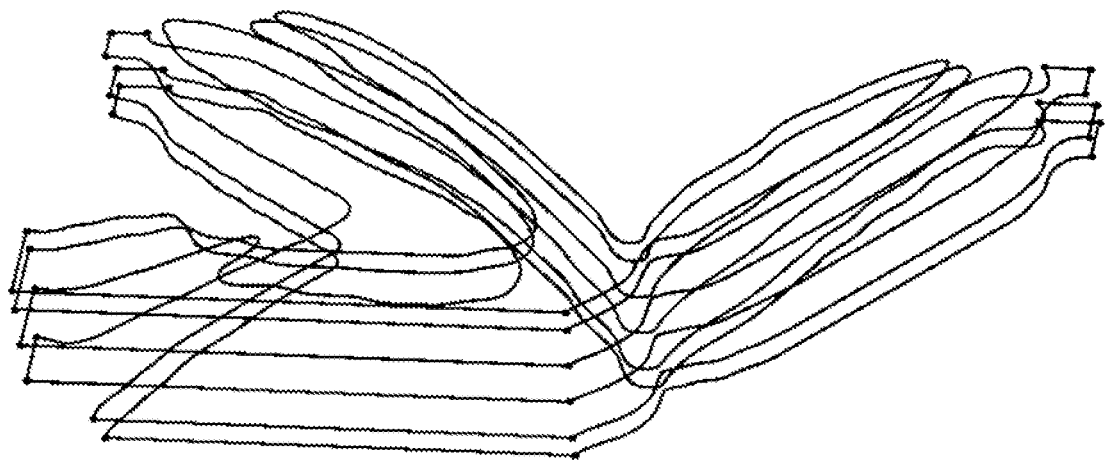
FIG. 5 is a schematic diagram of the arrangement of a plurality of layers of contours in Embodiment 1 of the present disclosure.

At S4, top contours are extracted for each surface in sequence by a contour extraction method. A specific extraction operation may be as shown in FIG. 3, and N two-dimensional isogeometric topology optimization results that sketches 1 to N, which correspond to 1 to N spline surfaces, are established. In the example, N=6 as shown in FIG. 4 is one of the obtained contours. In the example, the finally obtained contour sequences and an arrangement thereof are shown in FIG. 5.

Figure 6:
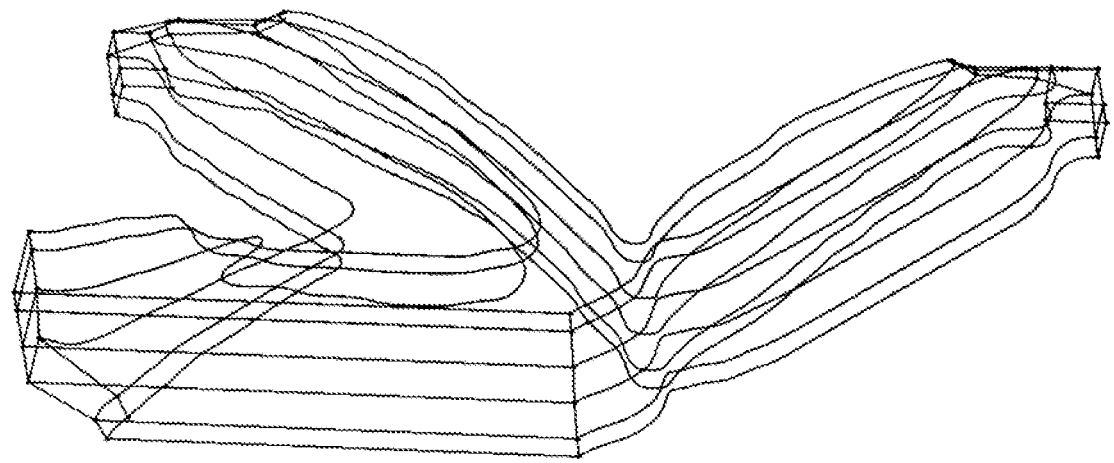
FIG. 6 is a geometric relationship of lofting contour lines and a plurality of layers of contour lines in Embodiment 1 of the present disclosure.

At S5, a plurality of line segment sketches are drawn to form lofting guide lines. In the example, nine guide lines that penetrate through each contour and are tangent to the contours are established. There is a guide line penetrating through each cusp. A geometric relationship between the final guide lines and the contours is as shown in FIG. 6.

At S6, whether there is a sketch having an internal contour is determined. S7 is performed if there is a sketch having an internal contour. S9 is performed if there is no sketch having any internal contours. In the example, the first three sketches have internal contours, and lofting and cutting operations need to be performed.

At S7, continuous lofting is performed on the external contours along an established lofting guide line.

At S8, continuous lofting and cutting are performed on the internal contours in the contours 1 to 3 along the lofting guide lines, and S10 is performed after the cutting directly reaches the next plane.

Figure 7:
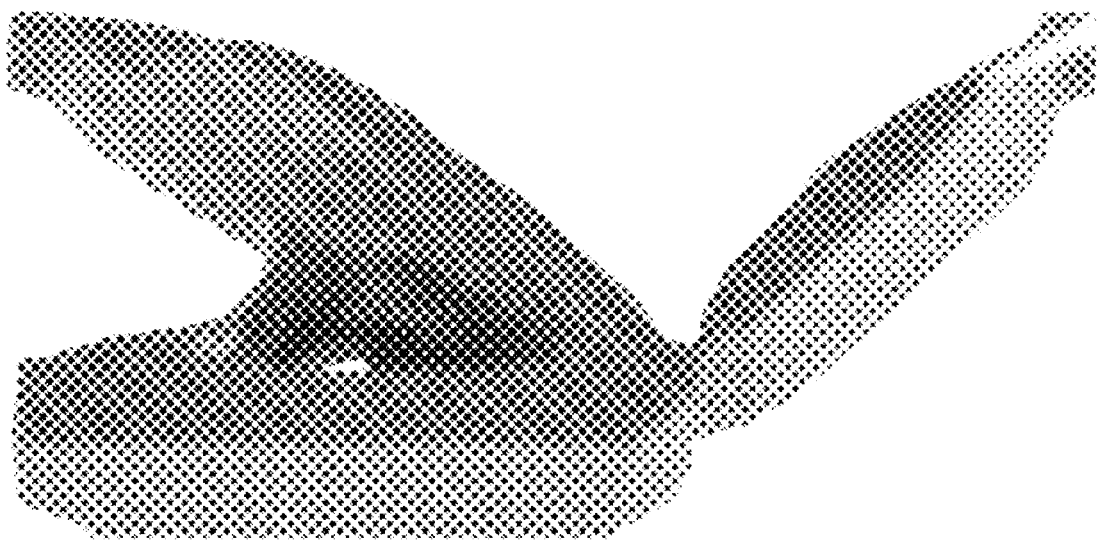
FIG. 7 is a schematic diagram of a model after the final lofting is completed in Embodiment 1 of the present disclosure.

At S9, continuous lofting is performed on each contour along the lofting guide line. At S10, an entity is output, and a finally obtained automatic construction model of the isogeometric topology optimization result is as shown in FIG. 7.

Embodiment 2

Figure 8:
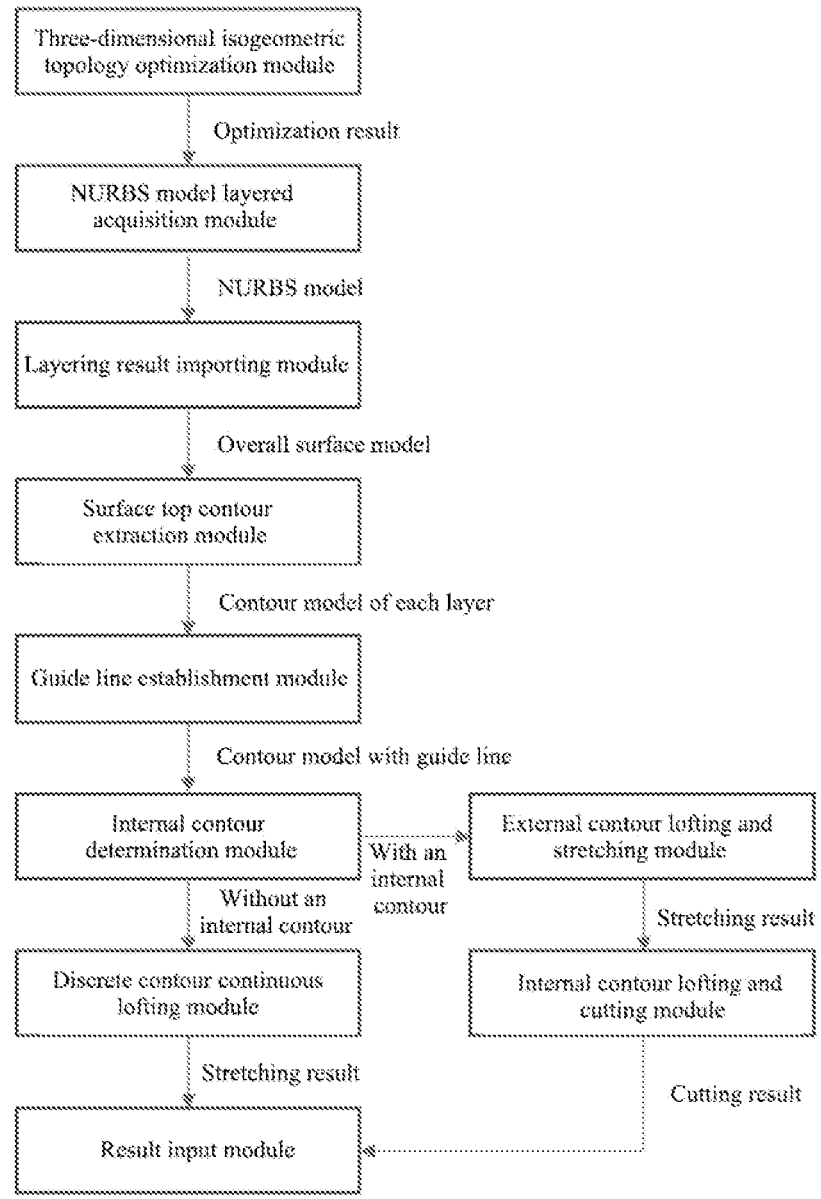
FIG. 8 is a structural diagram of a system for constructing an editable model of an isogeometric topology optimization result in Embodiment 2 of the present disclosure.

A system for automatically constructing an editable model of an isogeometric topology optimization result, as shown in FIG. 8, is used for implementing the method for automatically constructing an editable model of an isogeometric topology optimization result, and includes: a three-dimensional isogeometric topology optimization module, an NURBS model layered acquisition module, a layering result importing module, a surface top contour extraction module, a guide line establishment module, an internal contour determination module, an external contour lofting and stretching module, an internal contour lofting and cutting module, a discrete contour continuous lofting module, and a result output module.

The three-dimensional isogeometric topology optimization module solves any three-dimensional topology optimization problem by using an isogeometric topology optimization method.

The NURBS model layered acquisition module is used for layering an isogeometric topology optimization result into a plurality of spline surfaces according to a certain direction to obtain an NURBS surface of each layer.

The layering result importing module is used for importing spline surface results of geometric topology optimization acquired in layers into CAD software.

The surface top contour extraction module is used for extracting a top contour feature of each input surface.

The guide line establishment module is used for establishing a broken line segment that is connected end to end in a sequence from bottom to top, and ensures that each broken line section penetrates through a contour group corresponding thereto.

The internal contour determination module is used for determining whether a contour sketch has an internal contour. Continuous lofting and stretching as well as stretching and cutting need to be performed on the internal contours and the external contours respectively if the contour sketch has an internal contour; and only continuous lofting and stretching need to be performed on each group of contours if the contour sketch does not have an internal contour.

The external contour lofting and stretching module is used for performing continuous lofting and stretching on each of external contour groups corresponding to each other respectively.

The internal contour lofting and cutting module is used for performing continuous lofting and cutting on each of internal contour groups corresponding to each other respectively, and meanwhile, ensures that the cutting penetrates through an entity.

The discrete contour continuous lofting module is used for performing continuous lofting and stretching on the contour groups without the internal contour respectively.

The result output module is used for outputting a selectable and editable entity finally obtained after lofting.

The abovementioned embodiments are preferred implementations of the present disclosure. However, the implementations of the present disclosure are not limited by the abovementioned embodiments. Any other changes, ornaments, replacements, combinations, and simplifications made without departing from the spiritual essence and principles of the present disclosure are all equivalent replacement methods, which are all included in the scope of protection of the present disclosure.

The invention claimed is:

1. A method for automatically constructing an editable model of an isogeometric topology optimization result, comprising the following steps:

S1, completing topology optimization on the basis of an isogeometric method to obtain an isogeometric topology optimization result;

S2, taking design variables as high-dimensional coordinates, and acquiring Non-Uniform Rational B-Spline (NURBS) models of various layers in layers to obtain layered NURBS surface information;

S3, automatically arranging and importing the layered NURBS surface information into Computer-Aided Design (CAD) software according to direction coordinates;

S4, extracting a top contour of each surface in sequence to obtain section geometric model of each layer, and establishing a sketch contour;

S5, establishing a guide line between corresponding contours of each contour group;

S6, determining whether there is a contour has an internal contour, and performing S7 if there is an internal contour, or performing S9 if there is no internal contour;

S7, performing continuous lofting on the external contours;

S8, performing continuous lofting and cutting on the internal contour;

S9, performing continuous lofting on each contour; and

S10, outputting an entity, and obtaining an automatic construction model of the isogeometric topology optimization result finally;

wherein the extracting a top contour of each surface in sequence includes:
  i. establishing a bottom reference surface parallel to a bottom of an input surface;
  ii. establishing an intersection reference surface parallel to the bottom reference surface to intersect the input surface;
  iii. cutting a surface part between the bottom reference surface and the intersection reference by using a surface cutting tool;
  iv. establishing a stretch on the intersection reference surface; and
  v. extracting a top contour line by using a conversion entity tool to obtain a sketch contour 1-N.

2. The method for automatically constructing an editable model of an isogeometric topology optimization result according to claim 1, wherein the acquiring NURBS models of various layers in layers is as follows specifically:
  directly representing control points at different height layers in the isogeometric topology optimization result as layered NURBSs, that is, taking the design variables as high-dimensional coordinates of the control points, so that the NURBS surfaces represented by the layered NURBSs have height changes, and layered NURBS surface information is obtained.

3. A system for automatically constructing an editable model of an isogeometric topology optimization result, used for implementing the method for automatically constructing an editable model of an isogeometric topology optimization result according to claim 2 comprising: a three-dimensional isogeometric topology optimization module, an NURBS model layered acquisition module, a layering establishment module, an internal contour determination module, an external contour lofting and stretching module, an internal contour lofting and cutting module, a discrete contour continuous lofting module, and a result output module, wherein
  the three-dimensional isogeometric topology optimization module solves any three-dimensional topology optimization problem by using an isogeometric topology optimization method;
  the NURBS model layered acquisition module is used for layering a three-dimensional isogeometric topology optimization result into a plurality of spline surfaces according to a certain direction to obtain an NURBS surface of each layer;
  the layering result importing module is used for importing spline surface results of geometric topology optimization acquired in layers into CAD software;
  the surface top contour extraction module is used for extracting a top contour feature of each input surface;
  the guide line establishment module is used for establishing a broken line segment that is connected end to end in a sequence from bottom to top, and ensures that each broken line section penetrates through a contour group corresponding thereto;
  the internal contour determination module is used for determining whether a contour sketch has an internal contour; continuous lofting and stretching as well as stretching and cutting need to be performed on the internal contours and the external contours respectively if the contour sketch has an internal contour; and continuous lofting and stretching need to be performed on each group of contours if the contour sketch does not have an internal contour;
  the external contour lofting and stretching module is used for performing continuous lofting and stretching on each of external contour groups corresponding to each other respectively;
  the internal contour lofting and cutting module is used for performing continuous lofting and cutting on each of internal contour groups corresponding to each other respectively, and meanwhile, ensures that the cutting penetrates through the entity;
  the discrete contour continuous lofting module is used for performing continuous lofting and stretching on the contour groups without internal contours respectively; and
  the result output module is used for outputting a selectable and editable entity finally obtained after lofting.

4. The method for automatically constructing an editable model of an isogeometric topology optimization result according to claim 1, wherein the automatically arranging and importing the layered NURBS surface information into CAD software according to direction coordinates is as follows specifically: generating the acquired layered NURBS surface information by analysis software and saving the layered NURBS surface information in a format that can be opened by the CAD software, that is, the parameters between surfaces of layers being consistent with an optimization result.

5. A system for automatically constructing an editable model of an isogeometric topology optimization result, used for implementing the method for automatically constructing an editable model of an isogeometric topology optimization result according to claim 4 comprising: a three-dimensional isogeometric topology optimization module, an NURBS model layered acquisition module, a layering result importing module, a surface top contour extraction module, a guide line establishment module, an internal contour determination module, an external contour lofting and stretching module, an internal contour lofting and cutting module, a discrete contour continuous lofting module, and a result output module, wherein
  the three-dimensional isogeometric topology optimization module solves any three-dimensional topology optimization problem by using an isogeometric topology optimization method;
  the NURBS model layered acquisition module is used for layering a three-dimensional isogeometric topology optimization result into a plurality of spline surfaces according to a certain direction to obtain an NURBS surface of each layer;

the layering result importing module is used for importing spline surface results of geometric topology optimization acquired in layers into CAD software;

the surface top contour extraction module is used for extracting a top contour feature of each input surface;

the guide line establishment module is used for establishing a broken line segment that is connected end to end in a sequence from bottom to top, and ensures that each broken line section penetrates through a contour group corresponding thereto;

the internal contour determination module is used for determining whether a contour sketch has an internal contour; continuous lofting and stretching as well as stretching and cutting need to be performed on the internal contours and the external contours respectively if the contour sketch has an internal contour; and continuous lofting and stretching need to be performed on each group of contours if the contour sketch does not have an internal contour;

the external contour lofting and stretching module is used for performing continuous lofting and stretching on each of external contour groups corresponding to each other respectively;

the internal contour lofting and cutting module is used for performing continuous lofting and cutting on each of internal contour groups corresponding to each other respectively, and meanwhile, ensures that the cutting penetrates through the entity;

the discrete contour continuous lofting module is used for performing continuous lofting and stretching on the contour groups without internal contours respectively; and the result output module is used for outputting a selectable and editable entity finally obtained after lofting.

6. The method for automatically constructing an editable model of an isogeometric topology optimization result according to claim 1, wherein the establishing a guide line between corresponding contours of each contour group is as follows specifically: there is at least one broken line segment that is connected end to end and penetrates through the overall model from top to bottom at an edge of the same group of continuous lofting contour; and each cusp of all contour sketches has at least one broken line segment penetrating through the cusp.

7. A system for automatically constructing an editable model of an isogeometric topology optimization result, used for implementing the method for automatically constructing an editable model of an isogeometric topology optimization result according to any-one of claim 6 comprising: a three-dimensional isogeometric topology optimization module, an NURBS model layered acquisition module, a layering result importing module, a surface top contour extraction module, a guide line establishment module, an internal contour determination module, an external contour lofting and stretching module, an internal contour lofting and cutting module, a discrete contour continuous lofting module, and a result output module, wherein the three-dimensional isogeometric topology optimization module solves any three-dimensional topology optimization problem by using an isogeometric topology the NURBS model layered acquisition module is used for layering a three-dimensional isogeometric topology optimization result into a plurality of spline surfaces according to a certain direction to obtain an NURBS surface of each layer;

the layering result importing module is used for importing spline surface results of geometric topology optimization acquired in layers into CAD software;

the surface top contour extraction module is used for extracting a top contour feature of each input surface;

the guide line establishment module is used for establishing a broken line segment that is connected end to end in a sequence from bottom to top, and ensures that each broken line section penetrates through a contour group corresponding thereto;

the internal contour determination module is used for determining whether a contour sketch has an internal contour; continuous lofting and stretching as well as stretching and cutting need to be performed on the internal contours and the external contours respectively if the contour sketch has an internal contour; and continuous lofting and stretching need to be performed on each group of contours if the contour sketch does not have an internal contour;

the external contour lofting and stretching module is used for performing continuous lofting and stretching on each of external contour groups corresponding to each other respectively;

the internal contour lofting and cutting module is used for performing continuous lofting and cutting on each of internal contour groups corresponding to each other respectively, and meanwhile, ensures that the cutting penetrates through the entity;

the discrete contour continuous lofting module is used for performing continuous lofting and stretching on the contour groups without internal contours respectively; and the result output module is used for outputting a selectable and editable entity finally obtained after lofting.

8. The method for automatically constructing an editable model of an isogeometric topology optimization result according to claim 1, wherein the determining whether there is an internal contour is based on the determination of machine vision, and a specific method is as follows: viewing and determining whether another one or more closed contours are included inside each closed contour by the methods of geometric topology feature recognition or computer vision; the closed contour included in another closed contour being referred to as an internal contour; and lofting and cutting need to be performed on the internal contour.

9. A system for automatically constructing an editable model of an isogeometric topology optimization result, used for implementing the method for automatically constructing an editable model of an isogeometric topology optimization result according to claim 8 comprising: a three-dimensional isogeometric topology optimization module, an NURBS model layered acquisition module, a layering establishment module, an internal contour determination module, an external contour lofting and stretching module, an internal contour lofting and cutting module, a discrete contour continuous lofting module, and a result output module, wherein the three-dimensional isogeometric topology optimization module solves any three-dimensional topology optimization problem by using an isogeometric topology optimization method;

the NURBS model layered acquisition module is used for layering a three-dimensional isogeometric topology optimization result into a plurality of spline surfaces according to a certain direction to obtain an NURBS surface of each layer;

the layering result importing module is used for importing spline surface results of geometric topology optimization acquired in layers into CAD software;

the surface top contour extraction module is used for extracting a top contour feature of each input surface;

the guide line establishment module is used for establishing a broken line segment that is connected end to end in a sequence from bottom to top, and ensures that each broken line section penetrates through a contour group corresponding thereto;

the internal contour determination module is used for determining whether a contour sketch has an internal contour; continuous lofting and stretching as well as stretching and cutting need to be performed on the internal contours and the external contours respectively if the contour sketch has an internal contour; and continuous lofting and stretching need to be performed on each group of contours if the contour sketch does not have an internal contour;

the external contour lofting and stretching module is used for performing continuous lofting and stretching on each of external contour groups corresponding to each other respectively;

the internal contour lofting and cutting module is used for performing continuous lofting and cutting on each of internal contour groups corresponding to each other respectively, and meanwhile, ensures that the cutting penetrates through the entity;

the discrete contour continuous lofting module is used for performing continuous lofting and stretching on the contour groups without internal contours respectively; and the result output module is used for outputting a selectable and editable entity finally obtained after lofting.

10. The method for automatically constructing an editable model of an isogeometric topology optimization result according to claim 1, wherein the performing continuous lofting on the external contours is as follows specifically: using a lofting and stretching tool to select corresponding contour in each sketch as a lofting contour line in sequence from bottom to top and select each line segment of the broken line segment intersecting the contour group as a lofting guide line in sequence from bottom to top.

11. A system for automatically constructing an editable model of an isogeometric topology optimization result, used for implementing the method for automatically constructing an editable model of an isogeometric topology optimization result according to claim 10 comprising: a three-dimensional isogeometric topology optimization module, an NURBS model layered acquisition module, a layering result importing module, a surface top contour extraction module, a guide line establishment module, an internal contour determination module, an external contour lofting and stretching module, an internal contour lofting and cutting module, a discrete contour continuous lofting module, and a result output module, wherein the three-dimensional isogeometric topology optimization module solves any three-dimensional topology optimization problem by using an isogeometric topology optimization method;

the NURBS model layered acquisition module is used for layering a three-dimensional isogeometric topology optimization result into a plurality of spline surfaces according to a certain direction to obtain an NURBS surface of each layer;

the layering result importing module is used for importing spline surface results of geometric topology optimization acquired in layers into CAD software;

the surface top contour extraction module is used for extracting a top contour feature of each input surface;

the guide line establishment module is used for establishing a broken line segment that is connected end to end in a sequence from bottom to top, and ensures that each broken line section penetrates through a contour group corresponding thereto;

the internal contour determination module is used for determining whether a contour sketch has an internal contour; continuous lofting and stretching as well as stretching and cutting need to be performed on the internal contours and the external contours respectively if the contour sketch has an internal contour; and continuous lofting and stretching need to be performed on each group of contours if the contour sketch does not have an internal contour;

the external contour lofting and stretching module is used for performing continuous lofting and stretching on each of external contour groups corresponding to each other respectively;

the internal contour lofting and cutting module is used for performing continuous lofting and cutting on each of internal contour groups corresponding to each other respectively, and meanwhile, ensures that the cutting penetrates through the entity;

the discrete contour continuous lofting module is used for performing continuous lofting and stretching on the contour groups without internal contours respectively; and the result output module is used for outputting a selectable and editable entity finally obtained after lofting.

12. The method for automatically constructing an editable model of an isogeometric topology optimization result according to claim 1, wherein the outputting an entity is as follows specifically: if there is a contour sketch has a cusp, then a side surface of the entity is spliced by a plurality of spline surfaces, and a splicing line is a broken line segment penetrating through the cusp at the cusp; if all sketches do not have a cusp, then the side surface of the entity is an overall spline surface; and a final model entity has the characteristics of being selectable and being editable.

13. A system for automatically constructing an editable model of an isogeometric topology optimization result, used for implementing the method for automatically constructing an editable model of an isogeometric topology optimization result according to claim 12 comprising: a three-dimensional isogeometric topology optimization module, an NURBS model layered acquisition module, a layering result importing module, a surface top contour extraction module, a guide line establishment module, an internal contour determination module, an external contour lofting and stretching module, an internal contour lofting and cutting module, a discrete contour continuous lofting module, and a result output module, wherein the three-dimensional isogeometric topology optimization module solves any three-dimensional topology optimization problem by using an isogeometric topology optimization method;

the NURBS model layered acquisition module is used for layering a three-dimensional isogeometric topology optimization result into a plurality of spline surfaces according to a certain direction to obtain an NURBS surface of each layer;

the layering result importing module is used for importing spline surface results of geometric topology optimization acquired in layers into CAD software;

the surface top contour extraction module is used for extracting a top contour feature of each input surface;

the guide line establishment module is used for establishing a broken line segment that is connected end to end in a sequence from bottom to top, and ensures that each broken line section penetrates through a contour group corresponding thereto;

the internal contour determination module is used for determining whether a contour sketch has an internal contour; continuous lofting and stretching as well as stretching and cutting need to be performed on the internal contours and the external contours respectively if the contour sketch has an internal contour; and continuous lofting and stretching need to be performed on each group of contours if the contour sketch does not have an internal contour;

the external contour lofting and stretching module is used for performing continuous lofting and stretching on each of external contour groups corresponding to each other respectively;

the internal contour lofting and cutting module is used for performing continuous lofting and cutting on each of internal contour groups corresponding to each other respectively, and meanwhile, ensures that the cutting penetrates through the entity;

the discrete contour continuous lofting module is used for performing continuous lofting and stretching on the contour groups without internal contours respectively; and the result output module is used for outputting a selectable and editable entity finally obtained after lofting.

14. A system for automatically constructing an editable model of an isogeometric topology optimization result, used for implementing the method for automatically constructing an editable model of an isogeometric topology optimization result according to claim 1, comprising: a three-dimensional isogeometric topology optimization module, an NURBS model layered acquisition module, a layering result importing module, a surface top contour extraction module, a guide line establishment module, an internal contour determination module, an external contour lofting and stretching module, an internal contour lofting and cutting module, a discrete contour continuous lofting module, and a result output module, wherein the three-dimensional isogeometric topology optimization module solves any three-dimensional topology optimization problem by using an isogeometric topology the NURBS model layered acquisition module is used for layering a three-dimensional isogeometric topology optimization result into a plurality of spline surfaces according to a certain direction to obtain an NURBS surface of each layer;

the layering result importing module is used for importing spline surface results of geometric topology optimization acquired in layers into CAD software;

the surface top contour extraction module is used for extracting a top contour feature of each input surface;

the guide line establishment module is used for establishing a broken line segment that is connected end to end in a sequence from bottom to top, and ensures that each broken line section penetrates through a contour group corresponding thereto;

the internal contour determination module is used for determining whether a contour sketch has an internal contour; continuous lofting and stretching as well as stretching and cutting need to be performed on the internal contours and the external contours respectively if the contour sketch has an internal contour; and continuous lofting and stretching need to be performed on each group of contours if the contour sketch does not have an internal contour;

the external contour lofting and stretching module is used for performing continuous lofting and stretching on each of external contour groups corresponding to each other respectively;

the internal contour lofting and cutting module is used for performing continuous lofting and cutting on each of internal contour groups corresponding to each other respectively, and meanwhile, ensures that the cutting penetrates through the entity;

the discrete contour continuous lofting module is used for performing continuous lofting and stretching on the contour groups without internal contours respectively; and the result output module is used for outputting a selectable and editable entity finally obtained after lofting.

\* \* \* \* \*

UNITED STATES PATENT AND TRADEMARK OFFICE
CERTIFICATE OF CORRECTION

| | | |
|---|---|---|
| PATENT NO. | : 12,450,828 B2 | Page 1 of 1 |
| APPLICATION NO. | : 18/265533 | |
| DATED | : October 21, 2025 | |
| INVENTOR(S) | : Yingjun Wang et al. | |

It is certified that error appears in the above-identified patent and that said Letters Patent is hereby corrected as shown below:

In the Specification

Column 7, Line 14, delete "whether there is a contour" and insert --whether a contour--

In the Claims

Column 12, Line 42, delete "specifically: if there is a contour" and insert --specifically: if a contour--

Signed and Sealed this
Ninth Day of December, 2025

John A. Squires
*Director of the United States Patent and Trademark Office*